United States Patent Office 3,660,537
Patented May 2, 1972

3,660,537
GRAFT COPOLYMERS CONTAINING ALLYL METHACRYLATE AND DIETHYLAMINO-ETHYL METHACRYLATE
Michael Fryd, Broomall, Pa., and Ying K. Lee, Cherry Hill, N.J., assignors to E. I. du Pont de Nemours and Company, Wilmington, Del.
No Drawing. Filed Jan. 28, 1970, Ser. No. 6,571
Int. Cl. C08f 15/16, 15/18
U.S. Cl. 260—885                  7 Claims

ABSTRACT OF THE DISCLOSURE

Graft copolymers having a backbone which is a copolymer composed of monomer (1) units of the esters of acrylic acid (AA) and methacrylic acid (MMA)
(2) allyl methacrylate (AMA) units, and optionally
(3) diethylaminoethyl methacrylate (DEAM) units and polymeric graft segments composed of monomer units of 2-ethyl hexyl acrylate (2-EHA) and/or butyl acrylate (BA).

SUMMARY OF THE INVENTION

This invention relates to graft copolymers.

These graft copolymers can be represented by the recurring unit structure A—B, where A is the backbone segment of the molecule and B is a graft segment, attached to A by a chemical bond.

The A portion of the molecule can be further represented by an a—b structure, i.e. the backbone is a copolymer composed of monomer units (a) and monomer units (b), where the (a) portion, i.e. the (a) monomer units, of the A segment is primarily composed of acrylic monomer units. The (b) portion, i.e. the (b) monomer units, of the A segment which provides potential grafting sites for the graft segment, is composed of allyl methacrylate (AMA) units and, optionally, diethylaminoethyl methacrylate (DEAM) units or its equivalents.

The graft segment(s) B of the graft copolymer is composed of monomer units of 2-ethyl hexyl acrylate (2-EHA) and/or butyl acrylate (BA).

Illustrative of useful acrylic monomers for the A portion of the backbone are the esters of acrylic acid and methacrylic acid. Lower alkyl methacrylates are preferred and methyl methacrylate (MMA) in particular is outstanding.

The (a) portion should constitute at least 85%, preferably from about 95 to 99.8% by weight of the total A segment.

Although ordinarily the (a) portion will be composed entirely of these acrylic units referred to above, up to about 50%, preferably up to about 20%, of its weight can consist of other monomers which do not contribute active grafting sites to the backbone. Illustrative of these are acrylic acid, methacrylic acid and their amides and nitriles; vinyl acetate; styrene; alpha methyl styrene; vinyl toluene, 3-(2-methacryloxyethyl) - 2,2 - spirocyclohexyloxazolidine, and the like.

The (b) portion, i.e. the monomer units (b), of the A backbone segment provides the potential active grafting sites, i.e. points for attachment for the B branch segment or segments.

The (b) portion of the A segment, which comprises up to 15%, preferably 0.2–5%, even more preferably 0.4–3%, by weight of the total A segment, can be monomer units of AMA and, optionally, 0.2–5%, preferably 0.2–2% of DEAM units or units of tert-butylaminoethyl methacrylate, aminoethylvinyl ether, or dimethylaminoethyl methacrylate. In no case should the (b) portion of the backbone constitute less than 0.2% or more than 15%, preferably less than 5% of the total weight of the backbone.

The molecular weight of the backbone component should be from 10,000 through about 450,000.

The B segment is the branch segment or branch segments of the graft copolymer. It is composed of units of 2-EHA, BA, 2-ethyl hexyl methacrylate (2-EHMA) or lauryl methacrylate (LMA). The prefered graft segment is composed of 2-EHA units or is a copolymer of 2-EHA and BA units.

The number average molecular weight of the graft segment or graft segments ordinarily will range from 2,000 to 50,000.

The graft segment or graft segments ordinarily constitute from 5–80% by weight of the total graft copolymer, with 10–50% being preferred. An even more preferred range is 10–25%.

The B portion of the graft copolymer is always the branch segment and will not contain any significant amount of a component which provides active grafting sites such as previously indicated by (b).

As will readily be understood by persons in this art, preparation of graft copolymers described above will typically result in a mixture of polymer molecules, of varying number of grafted side chains per molecule. The average number of grafted B segments per A or backbone segment is ordinarily 0.5–5, preferably 1–2.

The molecular weight of the total graft copolymer should be from 15,000–500,000.

UTILITY

When dispersed or dissolved in an appropriate organic liquid, the polymers form lacquers especially useful for finishing automobiles, appliances and the like. Films derived from the graft copolymers have a high degree of buffability, which suit them for finishing furniture.

Illustrative of organic liquids which can be used to prepare such lacquers are aromatic and aliphatic hydrocarbons, esters, ketones such as acetone or methylethyl ketone, alcohols such as ethanol or isopropanol, or mixtures of these. Before use, the compositions can be thinned to application viscosity with customary lacquer solvents.

The compositions before thinning will ordinarily have solids contents of 10–60%, by weight of the total composition.

Although the dispersions or solutions of the graft copolymers can be used as such, it is generally desirable to add pigments, plasticizers, in the usual ways and amounts.

These coating compositions are applied by dipping, brushing or spraying and the films coalesced by air-drying or baking for from 10 to 60 minutes at temperatures up to 350° C., to give clear durable finishes.

PREPARATION

The graft copolymers of the invention can be made by first preparing the backbone component. This is done by conventionally copolymerizing the monomeric units which comprise the (a) portion with the monomeric units which comprise the (b) portion.

Suitable amounts of appropriate monomers are mixed together in an organic liquid in which the resulting backbone will be soluble, such as a ketone, ester or aromatic hydrocarbon, together with from 0.1–2% by weight of a free radical polymerization initiator such as benzoyl peroxide, azobisisobutyrontrile or the like.

This mixture is then brought to reaction temperature and held there until conversion is from 75–95% complete, as determined by measuring the amount of unreacted monomers present.

To this mixture are then added an appropriate amount of the grafting monomer(s) and from 0.1–2% of a graft initiator such as t.-butyl peroxypivalate or t.-butyl peracetate. The mixture is brought to reflux temperature and held there until conversion to graft copolymer is greater than 90%.

The resulting graft copolymer can be isolated from the reaction mass by spray drying.

DESCRIPTION OF THE PREFERRED EMBODIMENTS

The following examples illustrate the various aspects of the invention in greater detail. However, it should be recognized that they are only illustrative. Variations from what is disclosed will undoubtedly occur to those skilled in the art, but will nevertheless be embraced by the inventive concept. All parts are by weight.

Example 1

(1) 304.9 parts of MMA, 3.2 parts of DEAM, 3.6 parts of AMA, 48.4 parts of butyl acetate, and 75.3 parts of ethyl acetate were mixed and heated to reflux temperature.

(2) A mixture of 1.40 parts of azobisisobutyronitrile and 15.4 parts of ethyl acetate was then added and the reaction mass held at reflux temperature for 10 minutes.

(3) A mixture of 0.43 part of azobisisobutyronitrile, 165.0 parts of ethyl acetate and 32.3 parts of butyl acetate was then added to the mass over an 80 minute period.

(4) Then a mixture of 21.5 parts of 2-EHA, 0.21 part of azobisisobutyronitrile and 17.9 parts of aliphatic hydrocarbon was added to the reaction mass, which was then brought to reflux temperature. This was followed by a 10 minute waiting period at reflux temperature.

(5) A mixture of 35.9 parts of 2-EHA and 0.36 part of t.-butyl peroxypivalate was then added over a 30 minute period. This was followed by the addition over a 45 minute period of a mixture of 35.9 parts of MMA, 0.43 part of t.-butyl peroxypivalate and 0.86 part of azobisisobutyronitrile.

(6) Next, 86.1 arts of aliphatic hydrocarbon and 0.21 part of t.-butyl peroxypivalate were mixed and added to the reaction mass over a 30 minute period, followed by a 30 minute waiting period.

(7) The reaction was concluded by adding 150.7 parts of aliphatic hydrocarbon to the reaction mass over a 20 minute period and then cooling it to give a dispersion (38.6% solids) of graft copolymer with an MMA/AMA/DEAM backbone and a poly (2-EHA) graft segment.

The graft copolymer can be isolated by spray drying.

Example 2

The procedure of Example 1 was used except that 14.4 parts of 2-EHA and 21.5 parts of BA were added in lieu of the 21.5 parts of 2-EHA in paragraph (4).

This reaction gave a graft copolymer having an MMA/AMA/DEAM backbone and a copolymeric graft segment of 2-EHA and BA. The dispersion had a 35.3% solids content.

Example 3

A pigment base was prepared by mixing 24.40 parts of the organosol of Example 1 with 14.10 parts of VM and P naptha, 14.05 parts of xylene, and 58.00 parts of $TiO_2$. The resulting paste was sand ground.

110.55 parts of the above pigment base were added with stirring to 186.52 parts of the organosol of Example 1, 18.00 parts of bis(methyl cyclohexyl)phthalate plasticizer, 17.90 parts of xylene and 18.03 parts of VM and P naptha.

This produced a white pigmented lacquer. It was thinned for spraying by adding, with stirring, 80 parts of butyl Cellosolve acetate, 49 parts of xylene and 49 parts of VM and P naptha to 222 parts of the white lacquer.

The resultant composition was sprayed and baked for 30 minutes at 325° F. to produce a durable white finish.

We claim:
1. A graft copolymer having
 (A) a backbone which is a copolymer comprised of
  (a) monomeric units of from 85–99.6%, by weight, of an ester of acrylic acid or methacrylic acid;
  (b) monomeric units which provide potential grafting sites of from 0.2–15%, by weight, of allyl methacrylate; and
  (c) from 0.2–5% by weight of diethylaminoethyl methacrylate, tert-butylaminoethyl methacrylate, aminoethylvinyl ether or dimethylaminoethyl methacrylate;

the total of the monomeric units which provide potential grafting sites not exceeding 15% by weight of the total backbone, and
 (B) a polymeric graft segment comprised of monomer units of 2-ethyl hexyl acrylate, butylacrylate, 2-ethyl hexyl methacrylate units or lauryl methacrylate units, the graft segment comprising from 5–80% by weight of the total graft copolymer.

2. The graft copolymer of claim 1 wherein
 (c) is composed of monomer units of diethylaminoethyl methacrylate.

3. The graft copolymer of claim 1 wherein B is comprised of monomer units of 2-ethyl hexyl acrylate.

4. The graft copolymer of claim 1 wherein B is comprised of monomer units of 2-ethyl hexyl acrylate and butyl acrylate.

5. The graft copolymer of claim 1 wherein (a) is comprised of monomer units of methyl methacrylate.

6. The graft copolymer of claim 1 wherein A is a copolymer comprised of monomer units of methyl methacrylate, allyl methacrylate and diethylaminoethyl methacrylate.

7. The graft copolymer of claim 1 wherein
 A is a copolymer comprised of monomer units of methyl methacrylate, allyl methacrylate and diethylaminoethyl methacrylate, and
 B is a copolymer comprised of monomer units of 2-ethyl hexyl acrylate and butyl acrylate.

References Cited
UNITED STATES PATENTS

| | | | |
|---|---|---|---|
| 2,958,673 | 11/1960 | Jen | 260—885 |
| 3,364,282 | 1/1968 | D'Alelio | 260—881 |
| 3,502,745 | 3/1970 | Minton | 260—878 |
| 3,541,037 | 11/1970 | Finn | 260—29.6 |

SAMUEL H. BLECH, Primary Examiner

J. SEIBERT, Assistant Examiner

U.S. Cl. X.R.

260—31.2 R, 31.8 M, 32.8 R, 33.2 R, 33.4 R, 33.6 VA, 41 R, 41 B, 80.73, 881